(12) United States Patent
Barkan et al.

(10) Patent No.: US 8,657,199 B2
(45) Date of Patent: Feb. 25, 2014

(54) COMPACT IMAGING ENGINE FOR IMAGING READER

(75) Inventors: Edward Barkan, Miller Place, NY (US); Mark Drzymala, Commack, NY (US)

(73) Assignee: Symbol Technologies, Inc., Holtzville, NY (US)

( * ) Notice: Subject to any disclaimer, the term of this patent is extended or adjusted under 35 U.S.C. 154(b) by 292 days.

(21) Appl. No.: 12/380,434

(22) Filed: Feb. 27, 2009

(65) Prior Publication Data
US 2010/0219248 A1  Sep. 2, 2010

(51) Int. Cl.
*G06K 7/10* (2006.01)

(52) U.S. Cl.
USPC ............ 235/462.42; 235/462.11; 235/462.41; 235/462.43

(58) Field of Classification Search
USPC ............ 235/462.08, 462.11, 462.14, 462.21, 235/462.24, 462.42, 472.01, 462.41, 462.43
See application file for complete search history.

(56) References Cited

U.S. PATENT DOCUMENTS

| | | | |
|---|---|---|---|
| 4,613,895 A | 9/1986 | Burkey et al. | |
| 4,794,239 A | 12/1988 | Allais | |
| 5,262,628 A | 11/1993 | Shepard et al. | |
| 5,304,786 A | 4/1994 | Pavlidis et al. | |
| 5,637,854 A | 6/1997 | Thomas | |
| 5,703,349 A | 12/1997 | Meyerson et al. | |
| 6,340,114 B1 | 1/2002 | Correa et al. | |
| 6,601,768 B2 * | 8/2003 | McCall et al. | ........... 235/462.42 |
| 7,017,817 B2 | 3/2006 | Ito et al. | |
| 2002/0139853 A1 | 10/2002 | Tsikos et al. | |
| 2003/0019934 A1 * | 1/2003 | Hunter et al. | .............. 235/462.2 |
| 2005/0103854 A1 | 5/2005 | Zhu et al. | |
| 2007/0152055 A1 | 7/2007 | Barber et al. | |
| 2007/0285698 A1 | 12/2007 | Wang et al. | |
| 2008/0239509 A1 | 10/2008 | Vinogradov | |
| 2008/0265035 A1 | 10/2008 | Vinogradov et al. | |
| 2008/0290171 A1 | 11/2008 | Vinogradov | |
| 2010/0219249 A1 | 9/2010 | Barkan et al. | |

FOREIGN PATENT DOCUMENTS

CN         1441379 A        9/2003

OTHER PUBLICATIONS

International Search Report and Written Opinion dated May 11, 2010 in related case PCT/US2010/024225.
International Preliminary Report on Patentability and Written Opinion for counterpart International Patent Application No. PCT/US2010/024225 mailed on Sep. 9, 2011.
Notice of Allowance mailed on May 25, 2012 in European Patent Application No. 10725305.6.

(Continued)

*Primary Examiner* — Daniel Hess
(74) *Attorney, Agent, or Firm* — Nong-Qiang Fan

(57) ABSTRACT

A compact, low-cost, high-performance, imaging engine for an imaging reader for, and a method of, imaging targets, include a single printed circuit board (PCB), an illumination light assembly supported by the PCB for illuminating a target, a single chassis mounted on the PCB, an imaging lens assembly supported by the chassis for capturing return light from the illuminated target, and a solid-state imager supported by the PCB for detecting the captured return light over a field of view, and for generating an electrical signal indicative of the captured light. A controller is mounted on or off the imaging engine, and is operatively connected to, and controls the operation of, the imager and the illumination light assembly, for processing the electrical signal into data indicative of the target being imaged.

8 Claims, 5 Drawing Sheets

(56) References Cited

OTHER PUBLICATIONS

International Search Report and Written Opinion for International Patent Application No. PCT/US2010/024245 mailed on Aug. 12, 2010.
International Preliminary Report on Patentability and Written Opinion for International Patent Application No. PCT/US2010/024245 mailed on Sep. 9, 2011.
Non Final Office Action mailed on Oct. 18, 2010 in U.S. Appl. No. 12/380,440, Edward Barkan, filed Feb. 27, 2009.
Final Office Action mailed on May 19, 2011 in U.S. Appl. No. 12/380,440, Edward Barkan, filed Feb. 27, 2009.
Non Final Office Action mailed on Nov. 8, 2011 in U.S. Appl. No. 12/380,440, Edward Barkan, filed Feb. 27, 2009.
Final Office Action mailed on Apr. 26, 2012 in U.S. Appl. No. 12/380,440, Edward Barkan, filed Feb. 27, 2009.
Chinese Office Action Dated Jun. 28, 2013 for Counterpart Application 201080009587.2.
US Office Action Dated Sep. 26, 2013 for Related U.S. Appl. No. 12/380,440.

* cited by examiner

COMPACT IMAGING ENGINE FOR IMAGING READER

DESCRIPTION OF THE RELATED ART

Solid-state imaging systems or imaging readers have been used, in both handheld and hands-free modes of operation, to capture images from diverse targets, such as symbols to be electro-optically decoded and read and/or non-symbols to be processed for storage and display. Symbols include one-dimensional bar code symbols, particularly of the Universal Product Code (UPC) symbology, each having a linear row of bars and spaces spaced apart along a scan direction, as well as two-dimensional symbols, such as Code 49, a symbology that introduced the concept of vertically stacking a plurality of rows of bar and space patterns in a single symbol, as described in U.S. Pat. No. 4,794,239. Another two-dimensional code symbology for increasing the amount of data that can be represented or stored on a given amount of surface area is known as PDF417 and is described in U.S. Pat. No. 5,304,786. Non-symbol targets can include any person, place or thing, e.g., a signature, whose image is desired to be captured by the imaging reader.

The imaging reader includes an imaging engine having a solid-state imager with an array of photocells or light sensors that correspond to image elements or pixels in a two-dimensional field of view of the imager, an illumination light assembly for uniformly illuminating the target with illumination light from illumination light emitting diodes (LEDs) and illumination lenses, and an imaging lens assembly for capturing return illumination and/or ambient light scattered and/or reflected from the target being imaged, and for focusing the return light onto the sensor array to initiate capture of an image of the target as pixel data.

The imager may be a one- or two-dimensional charge coupled device (CCD) or a complementary metal oxide semiconductor (CMOS) device and includes associated circuits for converting the pixel data into electrical signals corresponding to a one- or two-dimensional array of the pixel data over the field of view. The imager is analogous to the imager used in an electronic digital camera.

The imager captures the return light under the control of a controller or programmed microprocessor that is operative for processing the electrical signals from the imager. When the target is a symbol, the controller is operative for processing and decoding the electrical signals into decoded information indicative of the symbol being imaged and read. When the target is a non-symbol, the controller is operative for processing the electrical signals into a processed image of the target, including, among other things, de-skewing the captured image, re-sampling the captured image to be of a desired size, enhancing the quality of the captured image, compressing the captured image, and transmitting the processed image to a local memory or a remote host.

It is therefore known to use the imager for capturing a monochrome image of a target symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

Since an operator of the imaging reader cannot see exactly whether a target is located entirely within the field of view of the array during reading, or know whether the target is optimally centrally located within the field of view, the imaging engine also typically includes an aiming light assembly for projecting a visible aiming light pattern, for example, a generally circular spot or cross-hairs for placement at the center of the target, or framing lines to bound the field of view, to assist the operator in visually locating the target within the field of view and, thus, advise the operator in which direction the reader is to be moved in order to position the aiming light pattern on the target prior to reading. The aiming light assembly includes at least one light source, such as a laser or an LED, an aiming lens, and a pattern shaping optical element, such as a diffractive optical element (DOE), or a refractive optical element (ROE). The focused light passing through a respective DOE forms multiple diverging beamlets, as described in U.S. Pat. No. 6,340,114, which project continuous lines or rows of spots arrayed in the aiming light pattern on the target to indicate the field of view of the imager.

As advantageous as such known imaging engines have been, they have proven to be less than satisfactory in certain situations. For example, the known imaging engines are expensive not only in terms of component cost, but also in the labor cost of assembling and aligning their various components. The known imaging engines add non-negligible weight and size to their readers, which is undesirable for the reader whose size and weight are required to be low. Also, the known imaging engines and readers often comprise a subsidiary system in an electrical apparatus, such as a price checker in a retail store, an airport gate check-in kiosk, a lottery machine, etc., that performs other functions, and hence, the imaging engines and readers must be as light in weight and as compact as possible.

More specifically, one known imaging engine includes a chassis on which a plurality of printed circuit boards (PCBs) are mounted. The imager is typically mounted on one of the PCBs, while other components, e.g., the illumination LEDs, are mounted on another of the PCBs. The mounting of a plurality of PCBs on the chassis requires mechanical fasteners, as well as electrical interconnects, such as cables, between the PCBs. Another known imaging engine includes a plurality of chassis mounted on a single PCB. An internal chassis supports some of the components, e.g., the imaging lens assembly, while other components are mounted on an external chassis.

The market for imaging readers is growing, but market growth is hampered by the relatively high cost of the imaging engines. The high cost is driven by their complex electromechanical structure, which employ multiple PCBs and/or multiple chassis, hand soldering, ribbon cable interconnects, multiple fasteners, alignment fixtures, etc, all contributing to added cost and complexity and, in turn, decreasing engine reliability. A compact, low-cost, high-performance, imaging engine would spur market growth.

SUMMARY OF THE INVENTION

One feature of the present invention resides, briefly stated, in an imaging engine for electro-optically imaging targets. The imaging engine includes a single printed circuit board (PCB), an illumination light assembly supported by the PCB for illuminating a target, a single chassis mounted on the PCB, an imaging lens assembly supported by the chassis for capturing return light from the illuminated target, and a solid-state imager supported by the PCB for detecting the captured return light over a field of view and for generating an electrical signal indicative of the captured light. A controller or programmed microprocessor may or may not be located on the PCB, and is operatively connected to, and controls the operation of, the imager and the illumination light assembly, for processing the electrical signal into data indicative of the target being imaged.

Preferably, the imager has an array of image sensors and is a CCD, a CMOS chip, or a wafer scale CCD, with a rolling or a global shutter. A CMOS chip with a global shutter is currently preferred. The imager may be an area or two-dimensional array having mutually orthogonal multiple rows and columns. The target may be a symbol having a plurality of elements of different light reflectivity, e.g., bars and spaces, and arranged in various symbologies. The target may be a non-symbol target, such as any person, place or thing whose image is desired to be captured by the imaging reader.

In a preferred embodiment, the illumination light assembly includes at least one illumination light emitting diode (LED), and preferably a pair of illumination LEDs spaced apart from each other on the PCB, and a pair of illumination lenses, each preferably, but not necessarily, mounted on each illumination LED, for optically modifying the illumination light as a pair of conical light beams that at least partially overlap on the target. The pair of illumination LEDs is located at opposite sides of the imager and is surface-mounted on the PCB.

An aiming light assembly could be included on the imaging engine, and includes an aiming light emitting diode (LED) supported by the PCB for emitting an aiming light beam, and an aiming lens supported by the chassis for optically modifying the aiming light beam to project an aiming pattern on the target. The aiming LED is located above or below the imager and is surface-mounted on the PCB. The aiming beam can also be used to wake up the reader after it has entered a sleep mode, in which case the imager detects when the target is positioned in the aiming light beam, and the controller initiates the imaging in response to the target detection.

Preferably, the chassis has a pair of threaded portions, and is mounted on the PCB by a pair of threaded fasteners that engage the threaded portions. The chassis is advantageously molded from a single piece of synthetic plastic material. The PCB lies in a mounting plane that is perpendicular to an optical axis along which the imaging lens assembly captures the return light. This mounting plane is advantageous for mounting the engine in various housings, such as a handheld or a hands-free housing.

Thus, the cost and the complexity of the imaging engine has been much reduced. The electromechanical structure is much simplified in that multiple PCBs and/or multiple chassis are not employed. There is no hand soldering of components. There are no ribbon cable interconnects between multiple PCBs. The number of fasteners is less than heretofore. These factors not only increase engine reliability, but also reduce the weight and size of the engine, thereby rendering it very light in weight and compact, and particularly desirable for inclusion as a subsidiary system in an electrical apparatus, such as a price checker in a retail store, an airport gate check-in kiosk, a lottery machine, etc., that performs other functions. The compact, low-cost, high-performance, imaging engine of this invention is designed to spur market growth of imaging readers.

Another feature of the present invention resides in a method of configuring an imaging engine for electro-optically imaging targets, and is performed by mounting a single chassis on a single printed circuit board (PCB), supporting an illumination light assembly on the PCB for illuminating a target, supporting an imaging lens assembly on the chassis for capturing return light from the illuminated target, supporting a solid-state imager on the PCB for detecting the captured return light over a field of view, and generating an electrical signal indicative of the captured light. Preferably, the electrical signal is processed into data indicative of the target being imaged.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
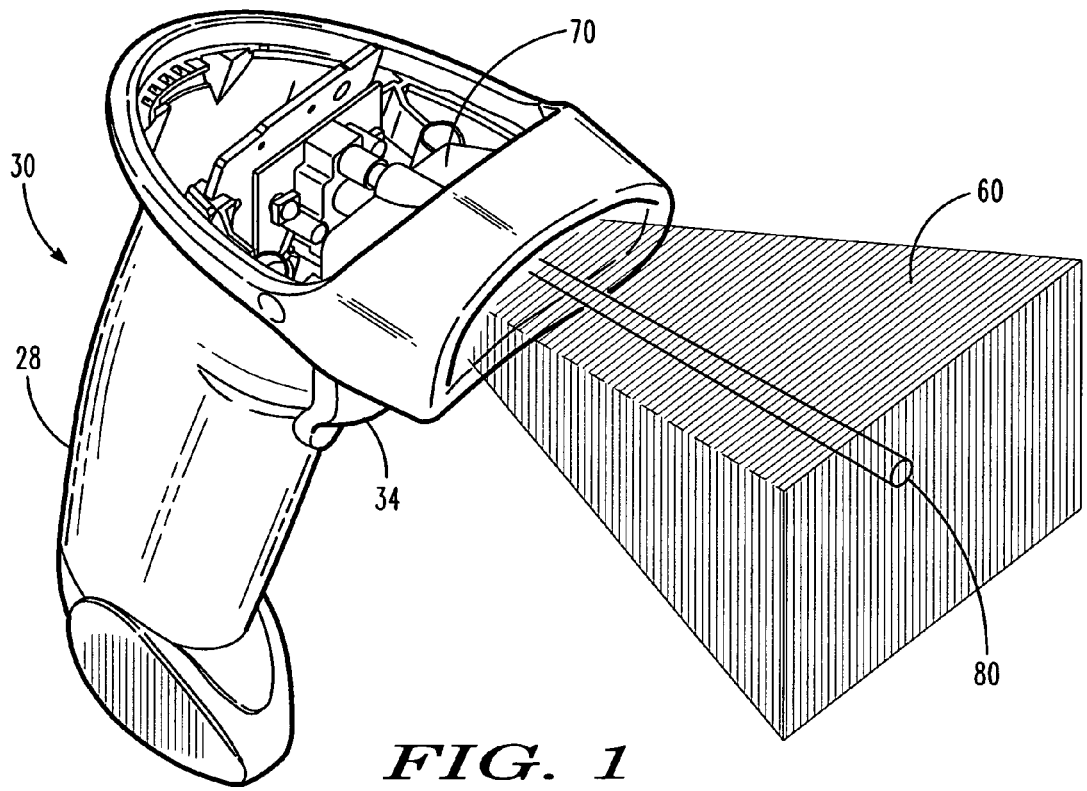
FIG. 1 is a broken-away, overhead, perspective view of one embodiment of a portable imaging reader operative in a handheld mode for imaging a target with an imaging engine according to this invention.
Figure 5:
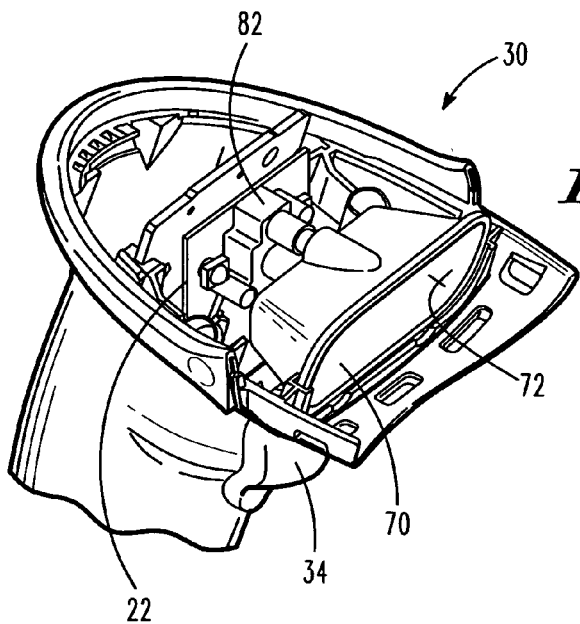
FIG. 5 is an enlarged, broken-away, overhead, perspective view of the portable imaging reader of FIG. 1 with more details of the imaging engine.
Figure 6:
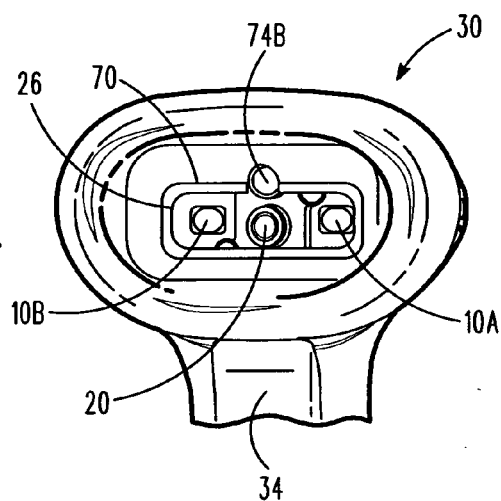
FIG. 6 is a broken-away, front elevational view of the portable imaging reader of FIG. 1.
Figure 8:
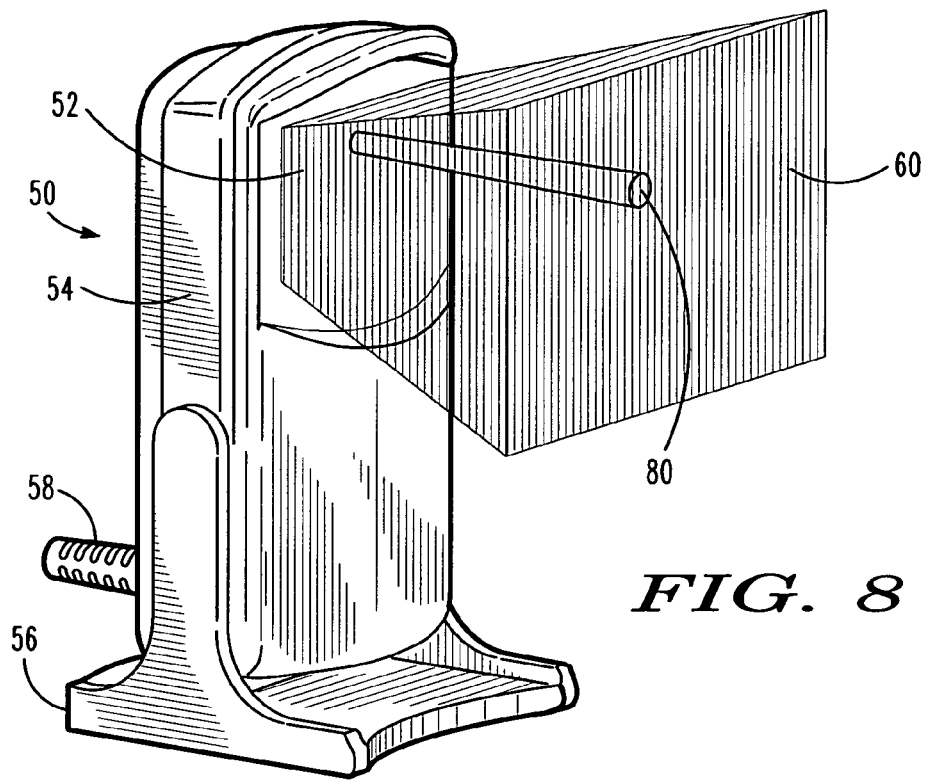
FIG. 8 is a perspective view of another embodiment of an imaging reader operative in a hands-free mode for imaging a target with the imaging engine according to this invention.

Reference numeral 30 in FIG. 1 generally identifies a portable, handheld imaging reader having a gun-shaped housing 28 and a light-transmissive window 26 (see FIG. 6) aimable at a target to be imaged. A trigger 34 is manually depressed by an operator to initiate imaging of targets, especially one- or two-dimensional symbols, and/or non-symbols, located at, or at a distance from, the window 26. Reference numeral 50 in FIG. 8 generally identifies a hands-free imaging reader having a light-transmissive window 52 and a box-shaped housing 54 supported by a base 56 for supporting the imaging reader 50 on a countertop or like support surface. The imaging reader 50 can thus be used as a stationary workstation in which targets are slid, swiped past, or presented to, the window 52, or can be picked up from the countertop and used as a handheld reader. Housings of other configurations can be employed. A data/power cable 58, as illustrated in FIG. 8, is connected to the reader 50, but can also be omitted, in which case, the reader 50 communicates with a remote host by a wireless link, and the reader 50 is electrically powered by an on-board battery. Each housing 28, 54 is configured with a bezel 70 (see FIG. 5), bounding a passage 72. The light-transmissive window 26, 52 is advantageously mounted in the passage 72 and is bounded by the bezel 70.

Figure 2:
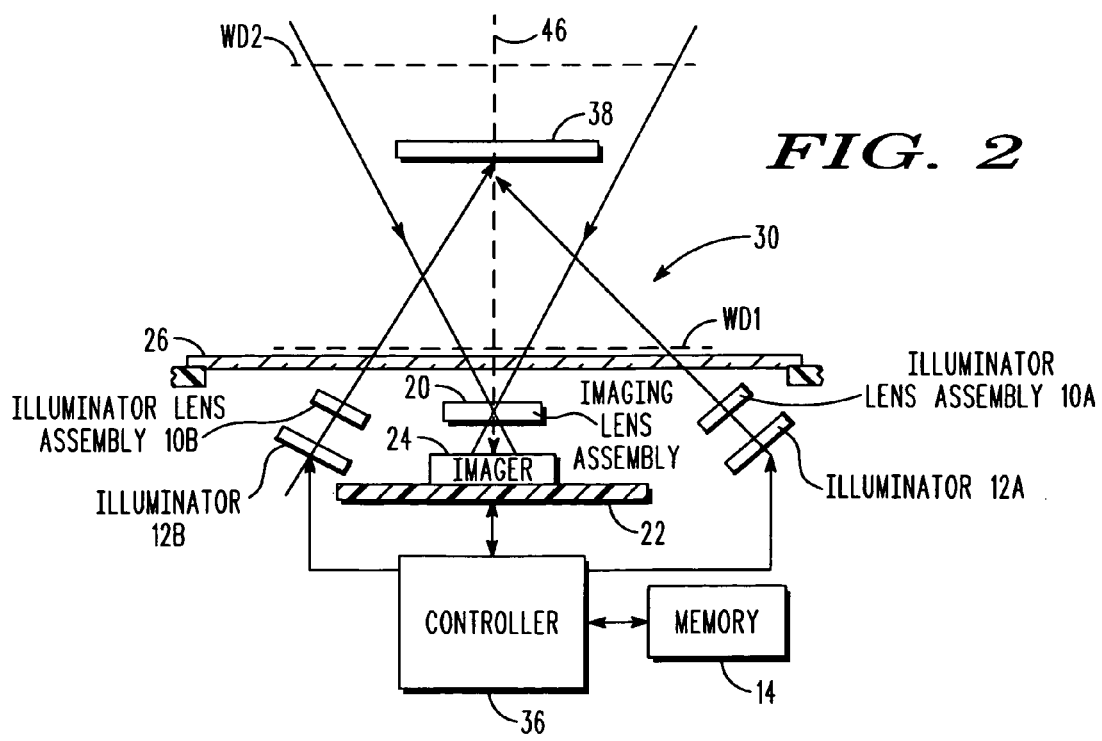
FIG. 2 is a schematic diagram of various components of the imaging engine in the reader of FIG. 1 in accordance with this invention.
Figure 3:
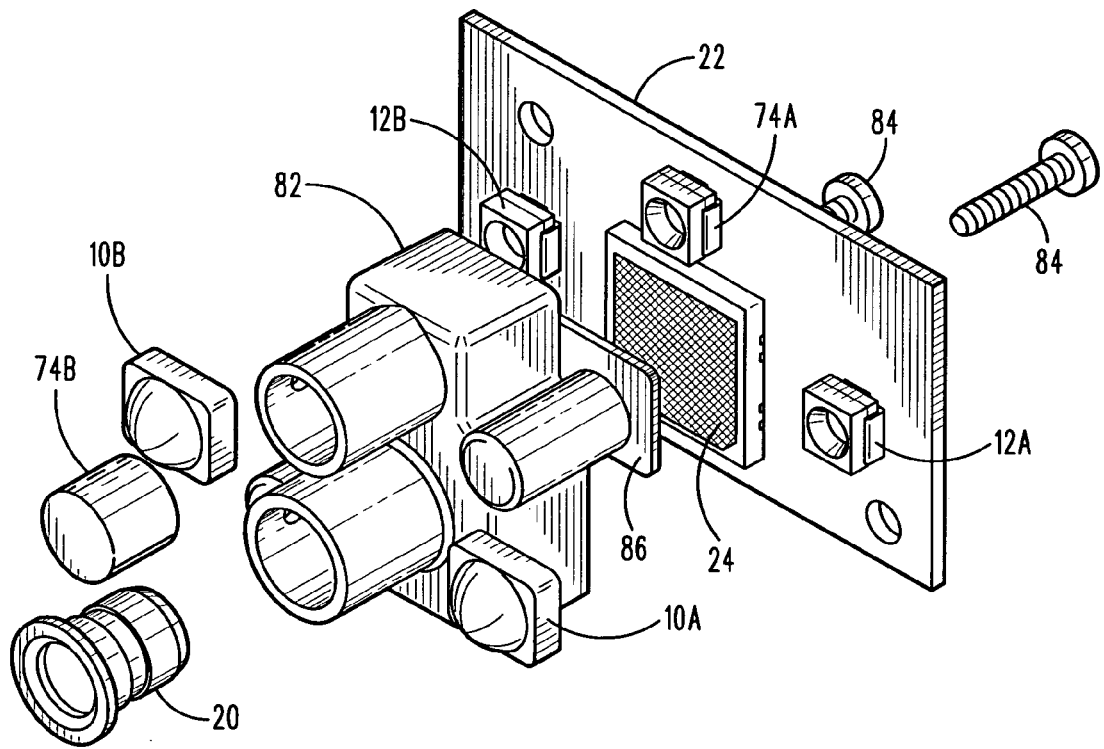
FIG. 3 is an exploded perspective view of the imaging engine for use in the reader of FIG. 1.
Figure 4:
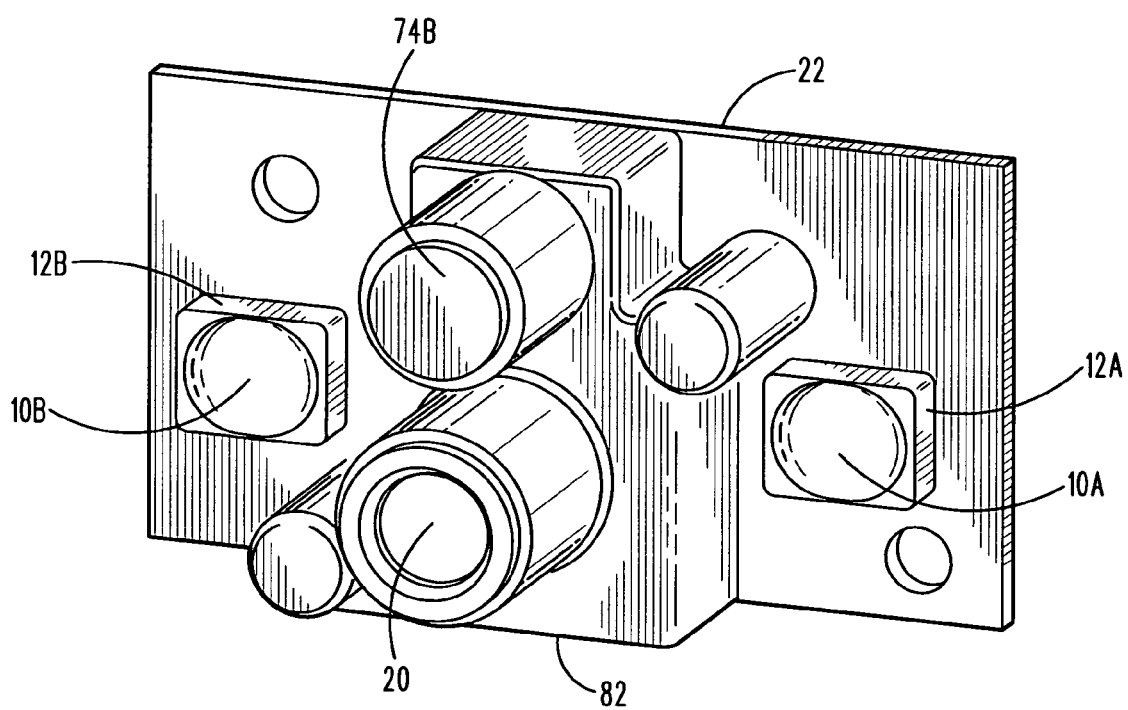
FIG. 4 is an assembled perspective view of the imaging engine of FIG. 3.

An imaging engine in accordance with this invention is shown in isolation out of the housing 28, 54 in an exploded view in FIG. 3, and in an assembled view in FIG. 4. As schematically shown in FIG. 2, the imaging engine includes an imager 24 mounted on a printed circuit board (PCB) 22 in each reader. The imager 24 is a solid-state device, for example, a CCD, a CMOS, or a wafer scale CCD, with a global or rolling shutter, having an area or two-dimensional array of addressable image sensors or pixels arranged in mutually orthogonal rows and columns, and operative for detecting return light captured by an imaging lens assembly 20 along an optical path or axis 46 through the window 26, 52. A CMOS with a global shutter is currently preferred. The return light is scattered and/or reflected from a target 38 as pixel data over a two-dimensional field of view. The imager 24 includes electrical circuitry, for example, an analog to digital converter, for converting the pixel data to electrical signals representing numbers indicative of the grey scale of each pixel. The imaging lens assembly 20 is operative for focusing the return light onto the array of image sensors to enable the target 38 to be read. The target 38 may be located anywhere in a working range of distances between a close-in working distance (WD1) and a far-out working distance (WD2). In a preferred embodiment, WD1 is about four to six inches from the imager 24, and WD2 can be many feet from the window 26, 52, for example, around fifty feet away.

Figure 7:
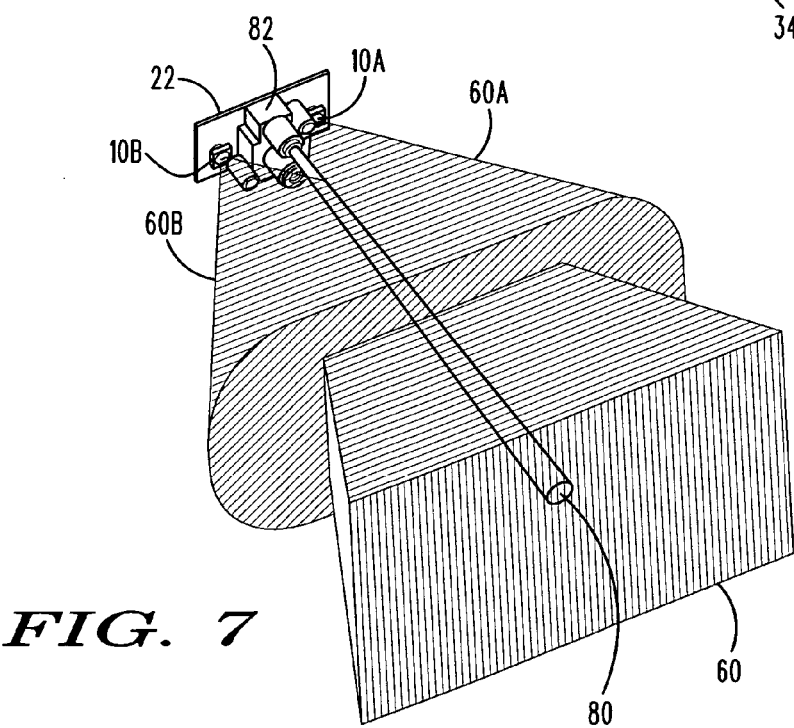
FIG. 7 is a diagrammatic perspective view of the imaging engine depicting the illumination light and the aiming beam projected therefrom.

In accordance with this invention, an illumination light assembly is also mounted on the imaging engine in each imaging reader and preferably includes an illuminator or illuminating light source 12, e.g., a pair of light emitting diodes (LEDs) 12A, 12B (see FIGS. 3-4) spaced apart from each other and surface-mounted on the PCB 22, and an illuminator lens assembly 10, e.g., a pair of illuminating lenses 10A, 10B (see FIGS. 3-4), each preferably, but not necessarily, mounted on a respective illumination LED 12A, 12B, for optically modifying the illumination light emitted from the illumination LEDs 12A, 12B to form, as shown in FIG. 7, a pair of conical light beams 60A, 60B that at least partially overlap on the target 38 to uniformly illuminate the target 38 with the illuminating light. The illumination LEDs 12A, 12B and the illuminating lenses 10A, 10B are schematically shown as being inclined or tilted relative to the window 26 in FIG. 2, only for purposes of illustration. In practice, the illumination LEDs 12A, 12B and the illuminating lenses 10A, 10B are arranged as shown in the other figures. The illumination LEDs 12A, 12B are preferably symmetrically located at opposite sides of the imager 24 and are spaced along the optical path 46 away from the bezel 70. The LEDs 12A, 12B are preferably pulsed for an exposure time period, but can be energized continuously.

As shown in FIG. 2, the illumination LEDs 12A, 12B are operatively connected to a controller or programmed microprocessor 36 operative for controlling the operation of these components. The imager 24 is also operatively connected to the controller 36. A local memory 14 is accessible by the controller 36 for storing and retrieving data.

In operation, the controller 36 sends a command signal to pulse the illumination LEDs 12A, 12B for the exposure time period, say 500 microseconds or less, and energizes and exposes the imager 24 to collect the return light, e.g., illumination light and/or ambient light, from the target 38 during the exposure time period. A typical array having a rolling shutter needs about 16-33 milliseconds to acquire the entire target image and operates at a frame rate of about 30-60 frames per second. A global shutter is currently preferred. Since the illumination LEDs 12A, 12B are only energized for a brief exposure time period, they can be driven at drive currents higher than heretofore. This allows the exposure time period to be as short as possible, and improves swipe speed tolerance, as well as increasing the performance and lowering the overall cost.

In operation, the illumination light assembly projects the illumination light comprised of beams 60A, 60B along the optical path 46 through the passage 72 to illuminate the target 38. At the same time, the illumination light projected through the passage 72 is clipped by the bezel 70 to form on the target 38 an aiming light distribution 60 that visually indicates a periphery of the field of view of the imager 24 to assist in positioning the target 38 entirely within the field of view. Preferably, the bezel 70 is circumferentially complete, and circumferentially clips the aiming light distribution 60 to visually indicate the entire periphery of the field of view. As a consequence, the operator will see a fairly sharp cut-off of the illumination light on the target 38. Parallax from the two illumination LEDs 12A, 12B will prevent the cut-off from being perfect, but there will be a visible degradation in the intensity of the illumination light beyond the periphery of the field of view, which is sufficient to indicate where the field of view ends and to enable the operator to avoid positioning the target even partially outside the field of view.

An aiming LED 74A is operative for emitting an aiming light beam, and an aiming lens 74B is operative for optically modifying the aiming light beam to project an aiming pattern or spot 80 centrally on the target 38. The aiming LED 74A and the imager 24 are commonly surface-mounted on the PCB 22, and the aiming LED 74A is preferably located midway between the illumination LEDs 12A, 12B at an elevation either above or below the imager 24. The aiming beam can also be used to wake up the reader after it has entered a sleep mode in which the illumination LEDs 12A, 12B are turned off, but the aiming LED 74A is turned on, and the imager 24 is used to detect when the target 38 is positioned in the aiming beam. In response to such detection, the controller 36 turns the illumination LEDs 12A, 12B on, and target imaging resumes. The aiming beam provides sufficient light to wake up the reader even in dark, ambient environments.

A chassis 82 overlies the PCB 22 and is connected thereto by a pair of fasteners 84 that engage a pair of threaded tubular portions on the chassis. Adhesives could also be used to connect the chassis 82 to the PCB 22. The chassis 82 holds the imaging lens 20 and the aiming lens 74B, and encloses the imager 24 to prevent stray ambient light from entering the imager 24. A cover glass 84 overlies and protects the imager 24. The chassis 82 is advantageously molded from a single piece of synthetic plastic material. The PCB 22 lies in a mounting plane that is perpendicular to the optical axis 46 along which the imaging lens assembly 20 captures the return light. This mounting plane is advantageous for mounting the engine in various housings, such as a handheld (FIG. 1) or a hands-free (FIG. 8) housing.

The chassis 82 also has an aperture or mask between the aiming LED 74A and the aiming lens 74B. This aperture can have any desired shape so that the spot 80 assumes that shape. The aiming lens 74B can be offset relative to the aperture to make the aiming beam slope slightly towards the optical axis 46 to make the aiming beam appear closer to the center of the field of view within the working distance range.

Thus, the cost and the complexity of the imaging engine has been much reduced. The electromechanical structure is much simplified in that multiple PCBs and/or multiple chassis are not employed. There is no hand soldering of components. There are no ribbon cable interconnects between multiple PCBs. The number of fasteners is less than heretofore. These factors not only increase engine reliability, but also reduce the weight and size of the engine, thereby rendering it very light in weight and compact, and particularly desirable for inclusion as a subsidiary system in an electrical apparatus, such as a price checker in a retail store, an airport gate check-in kiosk, a lottery machine, etc., that performs other functions. The compact, low-cost, high-performance, imaging engine of this invention is designed to spur market growth of imaging readers.

Figure 9:
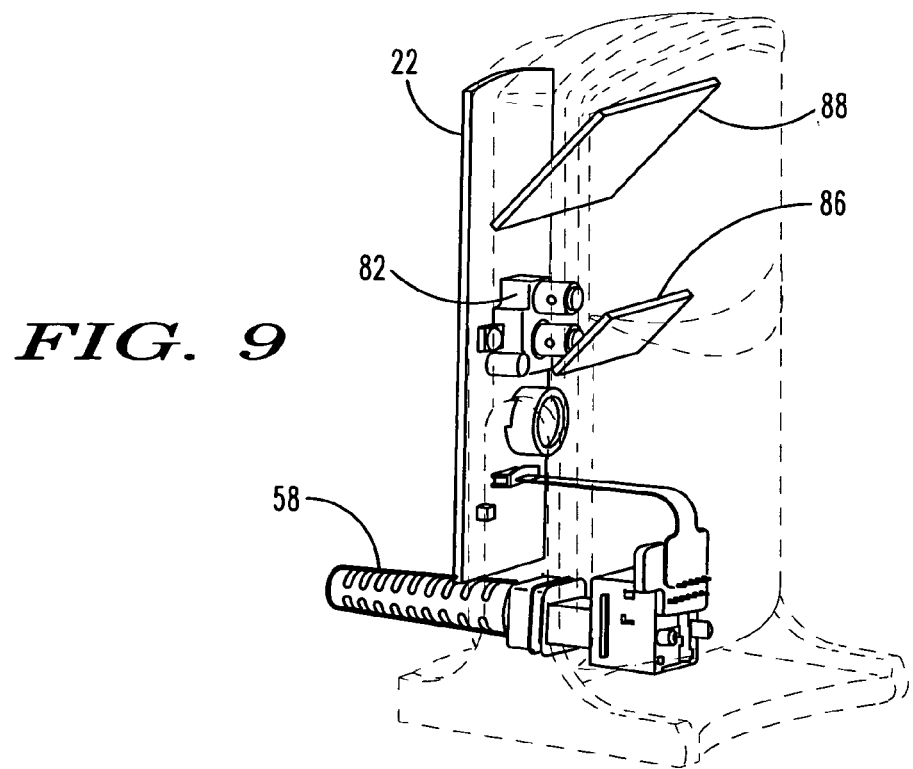
FIG. 9 is a perspective view of the interior of the imaging reader of FIG. 8 depicting the imaging engine.
Figure 10:
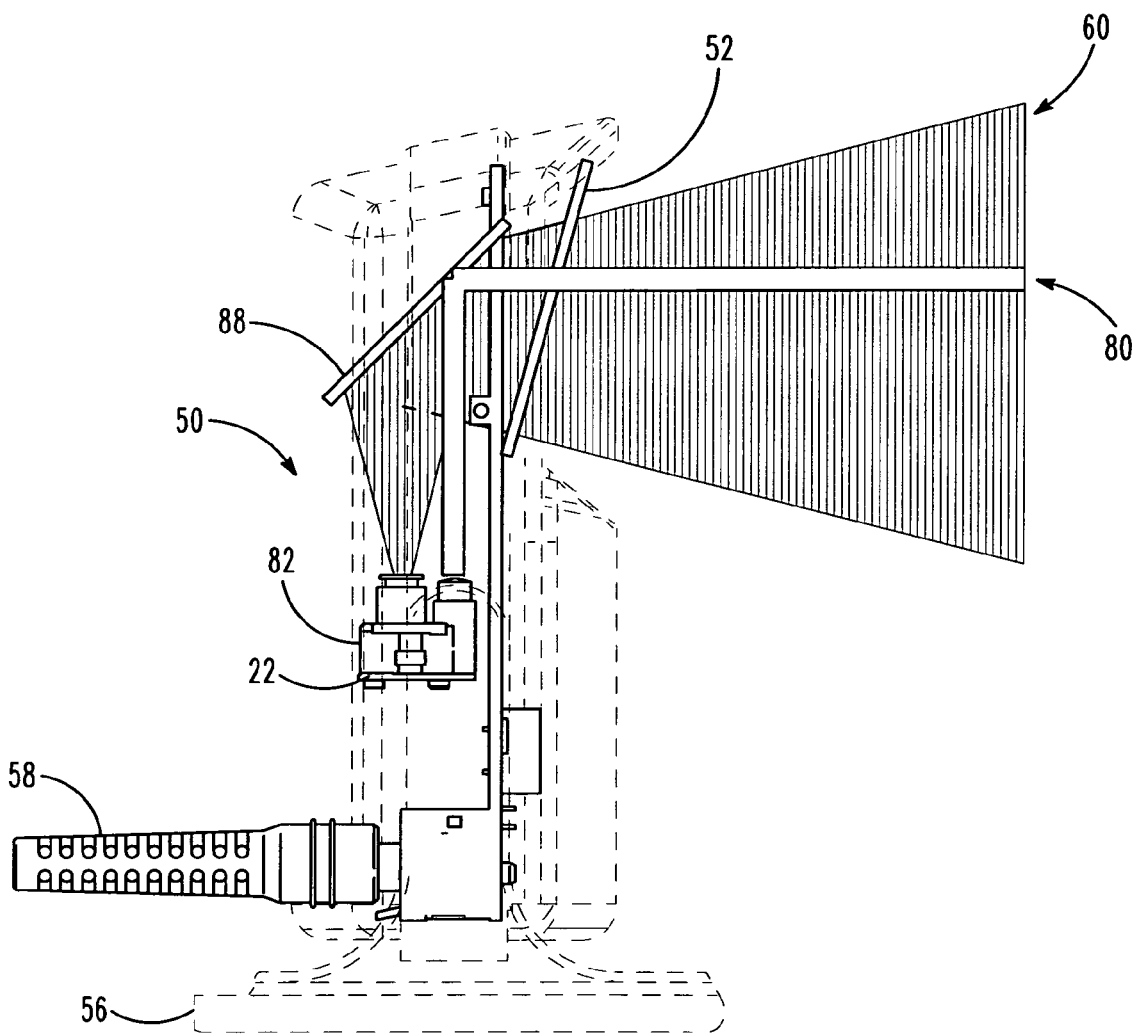
FIG. 10 is a side elevational view of the interior of another imaging reader operative in a hands-free mode for imaging a target with the imaging engine according to this invention.

In FIGS. 1-7, the imaging engine is mounted at about the same elevation as the bezel 70. In FIG. 9, the imaging engine is mounted below the bezel (not illustrated). A pair of fold mirrors 86, 88 twice folds the optical path along which the illumination light 60 and/or the aiming spot 80 travel. In FIG. 10, the imaging engine is turned 90 degrees as compared to its orientation in FIG. 9, thereby enabling one of the fold mirrors to be eliminated.

It will be understood that each of the elements described above, or two or more together, also may find a useful application in other types of constructions differing from the types described above. For example, the bezel 70 need not be a separate part, but could be part of the housing itself, or part of a rubber boot mounted at the front end region of the housing. Also, the use of a single pair of illumination LEDs, as described above, has a range of about ten inches from the window and a swipe speed of around 50 to 100 inches per second. Additional illumination LEDs, such as another pair, can be mounted on the PCB 22 to increase the working range and/or swipe speed. A single illumination LED can be mounted on the PCB 22 if such an increased working range and/or swipe speed is not desired.

While the invention has been illustrated and described as a compact, low-cost, high-performance, imaging engine and method of configuring the engine, it is not intended to be limited to the details shown, since various modifications and structural changes may be made without departing in any way from the spirit of the present invention. For example, this invention is not to be limited solely to imaging readers whose only function is to image targets, but could equally well apply to mobile computers or terminals having an imager 24 as one of its subsystems.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An imaging engine for electro-optically imaging targets, comprising:
   a single printed circuit board (PCB);
   an illumination light assembly supported by the PCB, for illuminating a target;
   a single chassis mounted on the PCB;
   an imaging lens assembly supported by the chassis, for capturing return light from the illuminated target;
   a solid-state imager supported by the PCB, for detecting the captured return light over a field of view, and for generating an electrical signal indicative of the captured light;
   wherein the illumination light assembly includes a pair of illumination light emitting diodes (LEDs) spaced apart from each other on the PCB, and a pair of illumination refractive lenses, one for each illumination LED and directly mounted on the corresponding LED, for optically modifying the illumination light as a pair of conical light beams that at least partially overlap on the target;
   an aiming light assembly including an aiming light emitting diode (LED) supported by the PCB for emitting an aiming light beam, and an aiming lens supported by the chassis for optically modifying the aiming light beam to project an aiming pattern on the target;
   wherein the pair of illumination LEDs is located at opposite sides of the imager and is surface-mounted on the PCB, and the aiming LED is located above or below the imager and is surface-mounted on the PCB;
   wherein the imaging lens assembly captures the return light along an optical axis, and wherein the PCB lies in a mounting plane that is perpendicular to the optical axis; and
   a fold mirror configured to fold both the optical path of the illumination light and the optical path of the aiming light beam.

2. The imaging engine of claim 1, wherein the imager is one of a charge coupled device, a complementary metal oxide silicon device and a wafer scale device.

3. The imaging engine of claim 1, wherein the chassis has a pair of threaded portions, and wherein the chassis is mounted on the PCB by a pair of threaded fasteners that engage the threaded portions.

4. The imaging engine of claim 1, wherein the chassis is molded from a single piece of synthetic plastic material.

5. A reader for electro-optically imaging targets, comprising:
   a housing;
   an imaging engine supported by the housing, the imaging engine including a single printed circuit board (PCB), an illumination light assembly supported by the PCB for illuminating a target, a single chassis mounted on the PCB, an imaging lens assembly supported by the chassis for capturing return light from the illuminated target, and a solid-state imager supported by the PCB for detecting the captured return light over a field of view and for generating an electrical signal indicative of the captured light;
   a controller supported by one of the housing and the imaging engine, and operatively connected to, and controlling operation of, the imager and the illumination light assembly, for processing the electrical signal into data indicative of the target being imaged;
   wherein the illumination light assembly includes a pair of illumination light emitting diodes (LEDs) spaced apart from each other on the PCB, and a pair of illumination refractive lenses, one for each illumination LED and directly mounted on the corresponding LED, for optically modifying the illumination light as a pair of conical light beams that at least partially overlap on the target;
   an aiming light assembly including an aiming light emitting diode (LED) supported by the PCB for emitting an aiming light beam, and an aiming lens supported by the chassis for optically modifying the aiming light beam to project an aiming pattern on the target;
   wherein the pair of illumination LEDs is located at opposite sides of the imager and is surface-mounted on the PCB, and the aiming LED is located above or below the imager and is surface-mounted on the PCB;

wherein the imaging lens assembly captures the return light along an optical axis, and wherein the PCB lies in a mounting plane that is perpendicular to the optical axis; and a folded mirror configured to fold the optical path along which the illumination light and the aiming light beam.

6. The reader of claim 5, wherein the chassis has a pair of threaded portions, and wherein the chassis is mounted on the PCB by a pair of threaded fasteners that engage the threaded portions.

7. A method of configuring an imaging engine for electro-optically imaging targets, comprising the steps of:

mounting a single chassis on a single printed circuit board (PCB);

supporting an illumination light assembly on the PCB, for illuminating a target;

supporting an imaging lens assembly on the chassis, for capturing return light from the illuminated target, wherein the imaging lens assembly captures the return light along an optical axis;

supporting a solid-state imager on the PCB, for detecting the captured return light over a field of view;

generating an electrical signal indicative of the captured light; and configuring the illumination light assembly as a pair of illumination light emitting diodes (LEDs) and a pair of illumination refractive lenses, spacing the illumination LEDs apart from each other on the PCB, and mounting each illumination refractive lens in front of a respective illumination LED;

projecting an aiming pattern on the target by supporting an aiming light emitting diode (LED) on the PCB for emitting an aiming light beam, and by supporting an aiming lens on the chassis;

wherein the pair of illumination LEDs is located at opposite sides of the imager and is surface-mounted on the PCB, and the aiming LED is located above or below the imager and is surface-mounted on the PCB;

orienting the PCB to lie in a mounting plane that is perpendicular to the optical axis; and folding both the optical path of the illumination light and the optical path of the aiming light beam with a fold mirror.

8. The method of claim 7, and a step of processing the electrical signal into data indicative of the target being imaged.

* * * * *